July 28, 1931. G. R. KELTIE 1,815,916
ROTATION INDICATING WRINGER ROLL
Filed Dec. 24, 1928
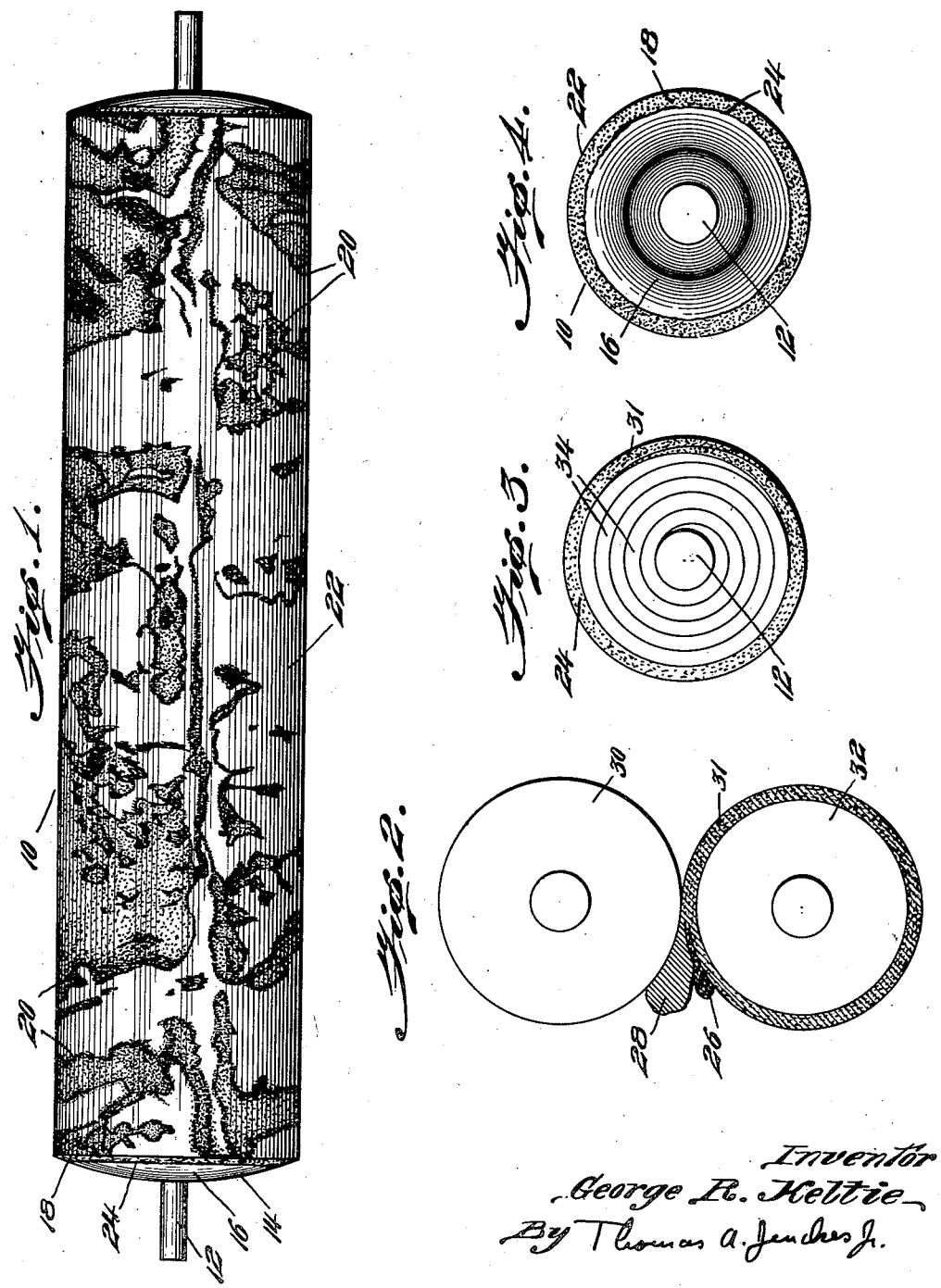
Inventor
George R. Keltie
By Thomas A. Jenckes Jr.
Attorney Patented July 28, 1931

1,815,916

UNITED STATES PATENT OFFICE

GEORGE R. KELTIE, OF WOONSOCKET, RHODE ISLAND, ASSIGNOR TO AMERICAN WRINGER CO., INC., OF WOONSOCKET, RHODE ISLAND, A CORPORATION OF RHODE ISLAND

ROTATION INDICATING WRINGER ROLL

Application filed December 24, 1928. Serial No. 328,223.

My invention relates to wringer rolls, particularly of the type that are used in power operated wringers in laundries.

In laundries, plain white wringer rolls are usually employed, which operate at a relatively high speed and because of the fact that the wringer roll is a dead white it is almost impossible to see whether the wringer roll is rotating or not. Often times the operative forgets that the rolls have been left in motion and because of the plain white surface and the lack of light in the laundries, is generally apt to place his hands against the rolls and receive severe injury.

The object of my invention is to provide a wringer roll which will clearly indicate whether the roll is rotating or not. I am aware that others have attempted to provide rotation indicating wringer rolls by incorporating a plurality of layers of evenly disposed spiral stripes around the wringer roll. When the wringer roll is rotating fast, as these spiral stripes are even they tend to merge with the contrasting white or other color of the body of the roll to form a homogenous composite color. In place of providing evenly distributed stripes on the periphery of the rotating wringer roll, I preferably provide the rotating wringer roll with a mottled peripheral face of very irregular appearance throughout the periphery thereof so that the colors thereof will not merge as the roll is being rotated fast, but will continuously form an uneven surface wherein as in moving pictures the irregular dots seems to move axially back and forth of the rotating face as the roll is being rotated.

A further object of my invention is to provide a wringer roll having an even or level peripheral face with a coloring medium irregularly incorporated therein to form an irregular mottled surface, preferably extending radially inwards a substantial distance of said roll to continuously maintain this irregular mottled surface as the roll wears down in use.

Further objects of my invention relate to improvements in manufacturing such a wringer roll.

These and such other objects of my invention as may hereinafter appear will be best understood from a description of the accompanying drawings which illustrate an embodiment thereof and various stops in the manufacture thereof.

In the drawings, Fig. 1 is a side elevation of a wringer roll constructed in accordance with my invention.

Fig. 2 is a diagrammatic end view of a relatively small amount of rubber of a contrasting color being incorporated into a rubber sheet during the calendering process.

Fig. 3 is an end view of my improved wringer roll prior to vulcanization showing a plurality of layers of sheet rubber of uniform color wrapped around an axial shaft and an exterior outer layer of mottled rubber wrapped around said interior layers.

Fig. 4 is an end view of my completed wringer roll shown in Fig. 1 with the different layers of rubber shown in Fig. 3 vulcanized to each other and to the shaft.

In the drawings, wherein like characters of reference indicate like parts throughout, 10 generally indicates a wringer roll constructed in accordance with the teachings of my invention.

Said wringer roll comprises the usual axial shaft 12 and the usual body portion 14 constructed of resilient plastic material, preferably of rubber having the uniformly colored central portion 16 and the irregularly colored outer peripheral portion 18 provided with the irregular mottled areas or dots 20 on the even or level periphery 22 thereof and extending a substantial distance radially inwards of said roll as at 24.

While the coloring medium may be irregularly incorporated into the peripheral face of the wringer roll in any suitable manner, I preferably manufacture the wringer roll as follows:

I first prepare a layer of sheet rubber by incorporating a relatively smaller amount 26 of rubber of a contrasting color into the mass 28 of rubber while said masses 26 and 28 are being passed through the rotating calendering rolls 30 and 32. In order to produce this mottled effect, the composite rubber sheet 31 is only passed a few times around the calendering rolls, or otherwise the rubber of contrasting color would be uniformly impregnated throughout the rubber sheet. The rubber sheet 31 may be suitably colored in any manner however by incorporating a suitable dye stuff or pigment therein or if desired a certain amount of gray rubber may be incorporated into white rubber which has been suitably whitened by the addition of whiting, chalk, or otherwise.

I then as shown in Fig. 3 wrap a plurality of layers 34 of white or other rubber of uniform color around the shaft 12 and I then wrap a layer or layers of the mottled rubber sheet 31 around the outer surface of said layers 34 to form the periphery of said roll. I then vulcanize in the usual manner said layers 31 and 34 to each other and the thus formed plastic rubber body portion 16 of the roll to the shaft 12 thus forming the uniform solid rubber wringer roll shown in Fig. 4. having the main central uniformly colored body portion 16 and the exterior mottled outer portion 24 extending radially inwards a substantial distance from the periphery 22 of said roll. While I preferably employ rubber, it is obvious that the wringer roll may be constructed of phenol condensation products or other suitable preferably resilient plastic materials, which may be suitably fused together.

It is thus apparent that I have provided a wringer roll having an extremely irregular outer periphery which on the rapid rotation thereof in present day power driven laundry machines will readily at all times indicate the rotation thereof, said mottled portion preferably extending a substantial distance radially inwardly of said roll to indicate the rotation thereof continuously as said roll wears down in use.

It is understood that my invention is not limited to the specific embodiments shown or methods described and that various deviations may be made therefrom without departing from the spirit and scope of the appended claims.

What I claim is:

1. A rotation indicating roll constructed of a plurality of rubber layers vulcanized together, the outer rubber layer having a coloring medium irregularly incorporated therein to provide a mottled rotation indicating peripheral face.

2. A rotation indicating roll constructed of a plurality of plastic layers fused together, the outer plastic layer having a coloring medium irregularly incorporated therein to provide a mottled rotation indicating peripheral face.

3. A rotation indicating roll having an axial shaft and a rubber body portion, the outer portion of said body portion having a coloring medium irregularly incorporated therein to form an irregular mottled portion extending radially inwards a substantial distance of said roll to present a mottled rotation indicating level peripheral face as said roll wears down in use.

4. A roll having its surface and the material of the roll immediately adjacent to the surface mottled to allow the rotation thereof to be readily perceived.

5. A wringer roll comprising an axial shaft and a solid rubber body portion, the exterior portion of said roll consisting of rubber of one color having a relatively smaller amount of rubber of a contrasting color irregularly incorporated therein.

6. A roll comprising an axial shaft and a solid body portion, the exterior portion of said roll consisting of material of one color having a relatively smaller amount of material of a contrasting color irregularly incorporated therein.

7. A wringer roll having an axial shaft and a solid body portion, the exterior portion of said roll having a coloring medium irregularly incorporated therein for a substantial distance radially inwards of the periphery thereof to present a mottled rotation indicating level peripheral face as said roll wears down in use.

In testimony whereof I affix my signature.

GEORGE R. KELTIE.